United States Patent
Thilagar et al.

(10) Patent No.: US 9,361,394 B2
(45) Date of Patent: Jun. 7, 2016

(54) RESPONSE HEADER INVALIDATION

(75) Inventors: Parthiban Thilagar, Hollis, NH (US);
Shu Ling, Redwood City, CA (US);
Michael J. Skarpelos, San Jose, CA (US); Naveen Zalpuri, Foster City, CA (US); Zhong Xu, San Jose, CA (US);
William A. Wright, Bedford, NH (US);
Patrick H. Fry, Brookline, NH (US);
Wei Lin, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 468 days.

(21) Appl. No.: 12/851,105

(22) Filed: Aug. 5, 2010

(65) Prior Publication Data
US 2012/0005433 A1 Jan. 5, 2012

Related U.S. Application Data

(60) Provisional application No. 61/360,117, filed on Jun. 30, 2010.

(51) Int. Cl.
*G06F 15/16* (2006.01)
*G06F 17/30* (2006.01)

(52) U.S. Cl.
CPC ................. *G06F 17/30902* (2013.01)

(58) Field of Classification Search
USPC ......... 709/201, 202, 203, 213, 223, 225, 226, 709/227, 228, 229, 217, 214, 215, 216, 218, 709/219, 230, 236; 707/200, 201, 202, 203, 707/204, 205, 999.2, 999.201, 999.202, 3, 707/E17.12; 705/26, 27; 711/118, 133, 141, 711/144, E12.037, 1, 111, 113, 114, 115, 711/116, 117, 122, 148, E12.01, 7; 715/26–27, 234

See application file for complete search history.

(56) References Cited

U.S. PATENT DOCUMENTS

| | | | | |
|---|---|---|---|---|
| 6,026,413 A * | 2/2000 | Challenger et al. | ........... | 717/108 |
| 6,085,234 A * | 7/2000 | Pitts et al. | ............. | 709/217 |
| 6,151,643 A * | 11/2000 | Cheng et al. | ............. | 710/36 |
| 6,275,908 B1 * | 8/2001 | Arimilli et al. | ............. | 711/146 |
| 6,408,360 B1 * | 6/2002 | Chamberlain et al. | ........ | 711/124 |
| 6,415,313 B1 * | 7/2002 | Yamada et al. | ............. | 709/200 |
| 6,460,122 B1 * | 10/2002 | Otterness et al. | ........... | 711/154 |
| 6,578,113 B2 * | 6/2003 | Krishnamurthy et al. | .... | 711/141 |
| 6,584,548 B1 * | 6/2003 | Bourne et al. | ............... | 711/134 |
| 6,934,720 B1 | 8/2005 | Jacobs et al. | | |
| 6,970,918 B2 * | 11/2005 | Brown et al. | ................. | 709/219 |
| 7,076,608 B2 | 7/2006 | Arunagirinathan et al. | | |
| 7,089,363 B2 | 8/2006 | Ling et al. | | |
| 7,143,244 B2 * | 11/2006 | Ling et al. | .................... | 711/141 |
| 7,412,535 B2 * | 8/2008 | Agarwalla et al. | ............ | 709/236 |
| 7,426,534 B2 * | 9/2008 | Challenger et al. | ........... | 709/203 |
| 7,492,763 B1 * | 2/2009 | Alexander, Jr. | ............... | 370/389 |
| 7,509,393 B2 * | 3/2009 | Agarwalla et al. | ............ | 709/217 |
| 7,809,813 B2 * | 10/2010 | Ma et al. | ....................... | 709/223 |
| 7,849,269 B2 * | 12/2010 | Sundarrajan et al. | ......... | 711/139 |
| 2002/0198956 A1 * | 12/2002 | Dunshea et al. | ............... | 709/214 |
| 2003/0061387 A1 * | 3/2003 | Brown et al. | ................. | 709/246 |
| 2003/0188016 A1 * | 10/2003 | Agarwalla et al. | ............ | 709/241 |

(Continued)

*Primary Examiner* — Saket K Daftuar
(74) *Attorney, Agent, or Firm* — Kraguljac Law Group, LLC

(57) ABSTRACT

Systems, methods, and other embodiments associated with content invalidation are described. One example method includes providing an invalidation directive in a header of a response.

13 Claims, 5 Drawing Sheets

(56) References Cited

U.S. PATENT DOCUMENTS

| | | | |
|---|---|---|---|
| 2003/0191800 A1* | 10/2003 | Challenger et al. | 709/203 |
| 2004/0117780 A1* | 6/2004 | Sea et al. | 717/159 |
| 2009/0268727 A1* | 10/2009 | Allison et al. | 370/389 |
| 2010/0174861 A1* | 7/2010 | Katz et al. | 711/113 |
| 2010/0281112 A1* | 11/2010 | Plamondon | 709/203 |
| 2011/0307540 A1* | 12/2011 | Martin | 709/203 |
| 2012/0124661 A1* | 5/2012 | Lee et al. | 726/13 |

* cited by examiner

```
<inval_response_header>    ::= "Oracle-WebCache-Invalidate:"
                                [ <sync_pred> "," ]
                                <inval_disjunct>
                                *( [ "," <sync_pred> ]
                                    "," <inval_disjunct> )
                                [ "," <sync_pred> ]

<sync_pred>                ::= <sync_directive> "=" ( "ON" | "OFF" )

<sync_directive>           ::= ( "SYNCHRONOUS" )

<inval_disjunct>           ::= ( <uri_pred> | <inval_multi_conjunct> )

<uri_pred>                 ::= <uri_directive> "=" <quoted_string>

<uri_directive>            ::= ( "URI" )

<inval_multi_conjunct>     ::= ( <uri_dir_pred> *(";" <skey_pred>)
                                | <skey_pred> *(";" <skey_pred>) )

<uri_dir_pred>             ::= <uri_dir_directive> "=" <quoted_string>

<uri_dir_directive>        ::= ( "URI_DIR" )

<skey_pred>                ::= <skey_directive> "=" <quoted_string>

<skey_directive>           ::= ( "S_KEY" )
```

Figure 5

RESPONSE HEADER INVALIDATION

CROSS REFERENCE TO RELATED APPLICATIONS

This disclosure claims the benefit of U.S. Provisional Patent Application Ser. No. 61/360,117; entitled "Response Header Based Invalidation"; filed Jun. 30, 2010, which is hereby incorporated by reference in its entirety.

BACKGROUND

Caching responses to HTTP (hypertext transfer protocol) requests allows for quicker response times to subsequent requests. However, the cached responses eventually become stale (out-of-date). To address stale content, there are a few mechanisms for marking specified cache responses as invalid (commonly referred to as invalidation).

The HTTP specification provides for invalidation through expiration timestamps. Timestamp-based invalidation mechanisms, including those described in the HTTP specification, are difficult for users because they often do not know a-priori how long a cached entry will remain valid. Thus having the user set the timestamp value is problematic.

Out-of-band invalidation requires extra overhead to establish a separate connection over a special invalidation port. Also, if the caching process sits behind a firewall, opening a connection via the special port requires "poking a hole" through the firewall, which is a potential security risk. In addition, out-of-band invalidation requests can have difficulty getting scheduled if normal HTTP request activity has reached a capacity limit.

ESI (Edge Side Include) inline invalidation only works when the response body contains an HTML document since ESI tags can only be embedded in HTML in the response body.

BRIEF DESCRIPTION OF THE DRAWINGS

The accompanying drawings, which are incorporated in and constitute a part of the specification, illustrate various systems, methods, and other embodiments. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some embodiments, an element shown as an internal component of another element may be implemented as an external component and vice versa. Furthermore, elements may not be drawn to scale.

FIG. 5 illustrates one embodiment of an invalidation header syntax.

DETAILED DESCRIPTION

Figure 1:
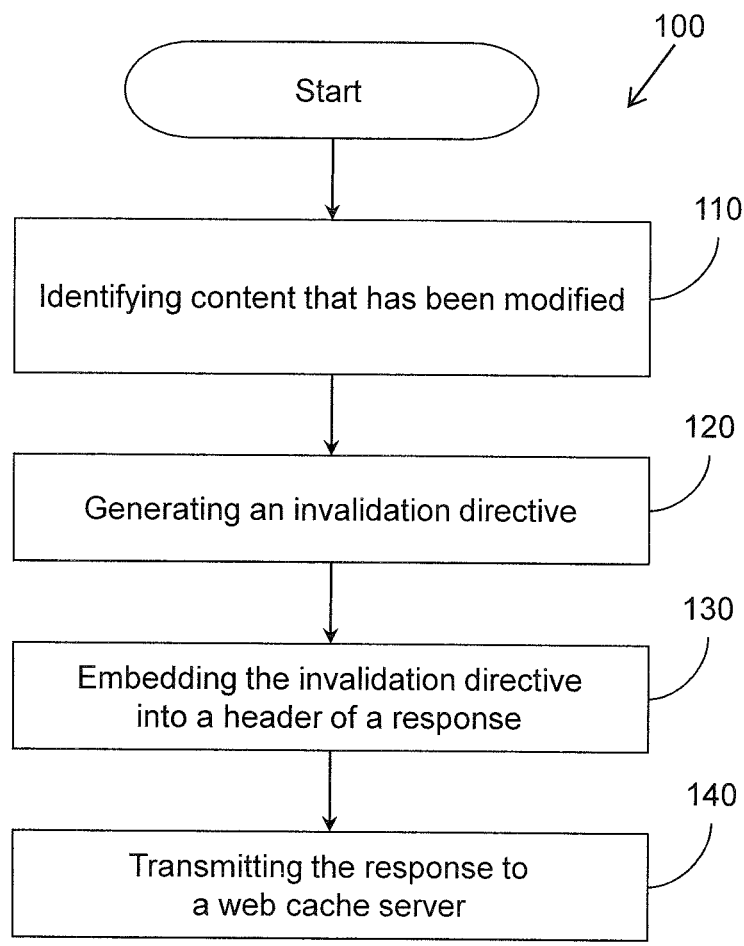
FIG. 1 illustrates one embodiment of a method associated with generating an invalidation directive.

In one embodiment, a response header invalidation mechanism is provided that specifies an invalidation directive via a pre-defined invalidation response header that is provided in response to a request. In one embodiment, the invalidation directive is embedded into a header of a response and specifies what content to invalidate. In one example, the response is a response to an HTTP request. Adding the invalidation directive to the header allows the request body to be any type of content. A component receiving the request is configured to identify and pull out the invalidation directive, and process it accordingly. Applications that employ caching to improve HTTP-request response times can benefit from faster and more secure invalidation of cached content.

In one embodiment, an origin server can determine when its content has been updated or modified in some way. When the content on the origin server changes, the corresponding content that is stored in other locations (e.g. a cache memory in a web cache server) becomes stale. The origin server generates an invalidation directive that includes instructions to invalidate the specified content. The invalidation directive is embedded into the header of an HTTP response that is sent to the web cache server. The web cache server then processes the invalidation directive and transmits/forwards the response to a client that submitted the request (HTTP request). In some cases, the body content of the HTTP response may be unrelated to the content identified by the invalidation directive in its header. In some cases, the body content of the HTTP response corresponds to the content that is to be invalidated in the cache.

In one embodiment, the response header invalidation mechanism directly causes cache entries to be invalidated when the invalidation directive is received by the web cache server.

Out-of-band invalidation is inefficient because of extra overhead needed to establish a new connection over a special invalidation port. In one embodiment, the response header invalidation mechanism works over a normal HTTP request port, so it uses no extra overhead to establish a port connection and it entails no extra security risk if the caching process sits behind a firewall. In addition, the response header invalidation arrives as part of a response to an already accepted HTTP request, so it does not face the same scheduling competition as out-of-band invalidation requests.

The response header invalidation mechanism, in contrast to ESI invalidation, works with any content type returned in the response body because it embeds instructions into the response header.

Both out-of-band invalidation and ESI-inline invalidation specify the cached content to be invalidated using XML directives. In one embodiment, the response header invalidation mechanism may use streamlined directives that cover specified invalidation cases (e.g. commonly occurring cases). Since XML parsing is significantly more expensive than parsing the streamlined directives, the response header invalidation takes less time than the alternative invalidation mechanisms.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory storage medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, a non-transitory computer-readable medium including stored instructions, instructions in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one logic. Similarly, where a single logic is described, it may be possible to distribute that single logic between multiple logics.

"User", as used herein, includes but is not limited to one or more persons, software, computers or other devices, or combinations of these.

With reference to FIG. 1, one embodiment of a method 100 is illustrated that is associated with invalidating data. Method 100 is described from the perspective of an origin server (e.g. content server, back-end server, and so on) that processes requests from clients. In one embodiment, the requests are HTTP requests and the origin server replies with HTTP responses. Of course, other protocols can be implemented when providing a response. Method 100 is also described in an environment where the origin server communicates with a caching device (e.g. web cache server) that stores selected content in cache memory. This will be discussed in greater detail with reference to FIG. 3.

In FIG. 1 at 110, method 100 identifies content that has been modified. For example, the origin server determines that some content has changed or has received a request to modify existing content that is controlled by the origin server. When content is modified, corresponding content that may be cached by the web cache server becomes stale.

At 120, an invalidation directive is generated that identifies the content to invalidate the content. At 130, the invalidation directive is embedded into a header of a response. For example when the response is generated for the HTTP request, the response includes a header and a body. The invalidation directive is inserted into the response header. At 140, the response is then transmitted to the web cache server. Upon receiving the response, the web cache server receives the invalidation directive and invalidates the specified content. One embodiment of this process is described with reference to FIG. 2.

Figure 2:
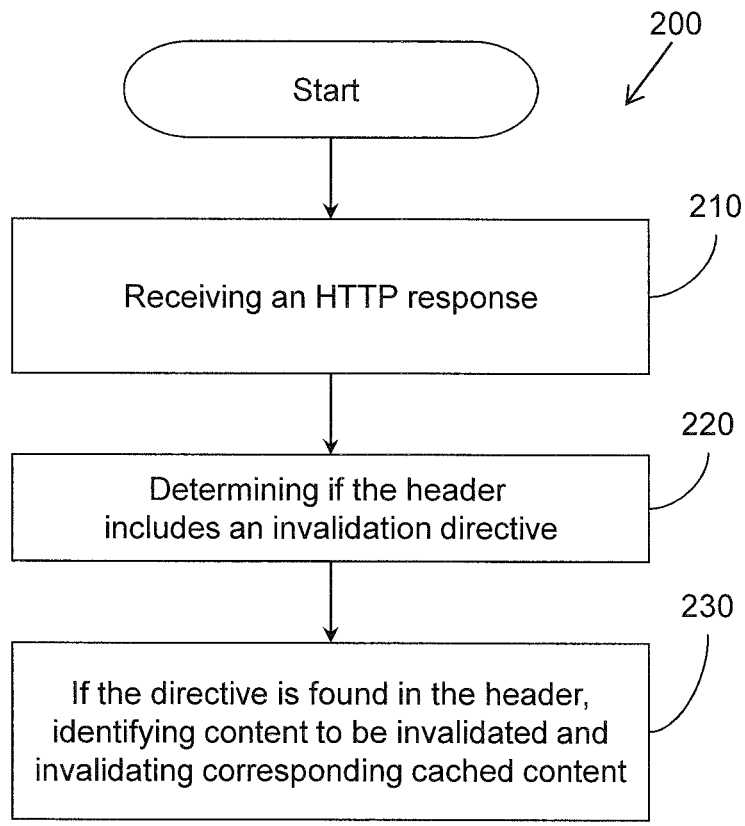
FIG. 2 illustrates one embodiment of a method associated with processing a response that includes an invalidation directive.

With reference to FIG. 2, one embodiment of a method 200 is illustrated that describes actions taken by the web cache server. Method 200 is also described in the context of processing HTTP requests and responses, although other protocols can be used. At 210, the web cache server receives an HTTP response from the origin server. At 220, the web cache server determines if the header of the response includes an invalidation directive. To perform this operation, the web cache server includes a function/logic that is configured to look for and identify invalidation directives from within a response header.

In one embodiment, the header is parsed to identify predetermined syntax and/or terms that are designed for the invalidation directive. Parsed syntax and/or terms can then be matched to a list of known syntax/terms that are associated with identifying invalidation directives. Example syntax is discussed below. In one embodiment, syntax in the header of the HTTP response is parsed to locate invalidation directive syntax (e.g. one or more known terms that represent an invalidation directive).

At 230, if the invalidation directive is found in the response header, the content to be invalidated is identified and then the corresponding content that is cached in memory is invalidated. For example, the header syntax is parsed to identify the content to be invalidated. The web cache server may then pass on the HTTP response to the requesting client to complete the transaction.

In another embodiment, the web cache server may modify the response by removing the invalidation directive from the response header prior to transmitting the response to the requesting client. As such, the requesting client receives a typical response without the pre-defined invalidation header.

Figure 3:
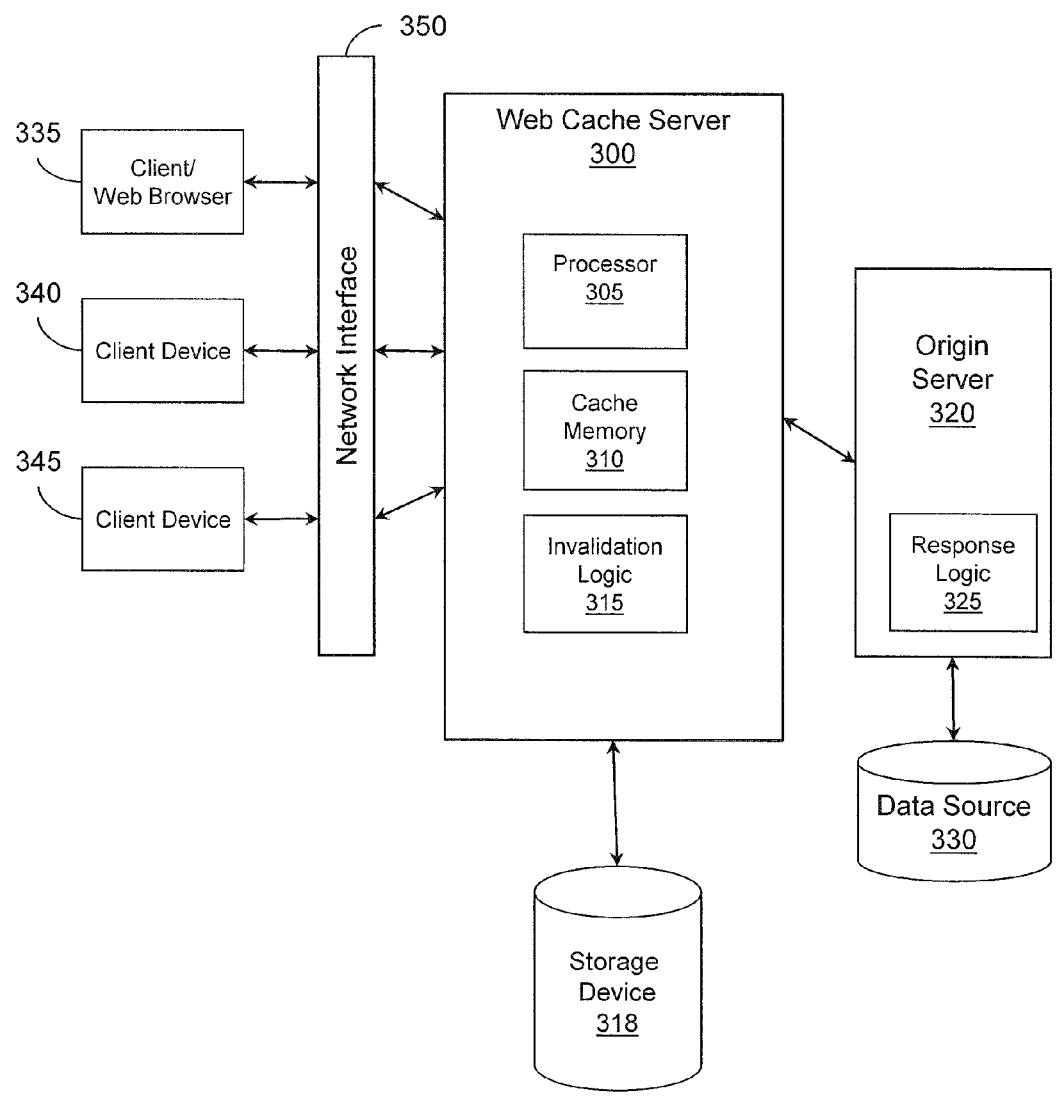
FIG. 3 illustrates one embodiment of a system with a web cache server and an origin server.

With reference to FIG. 3, one embodiment of a web cache server 300 is illustrated. The web cache server 300 is configured with at least a processor 305, cache memory 310, and invalidation logic 315. The web cache server 300 may also include a storage device 318. The invalidation logic 315 is configured to identify and process invalidation directives from the header of a response as discussed with reference to FIG. 2. Content that is to be invalidated is found in the cache memory 310 and invalidated according to the invalidation directive that is retrieved from a header.

An origin server 320 operates with the web cache server 300 and includes response logic 325. The response logic 325 is configured to generate the invalidation directives and embed the directives into the header of a response as discussed with reference to FIG. 1. The origin server 320 may be a back-end server, an HTTP server, a content management server, and so on. The origin server 320 may include one or more data sources 330 (e.g. data bases, web pages, files, and so on) that are stored on one or more data storage devices.

In one embodiment, the web cache server 300 is a computing/network device that provides reverse proxy cache deployed between a requesting device and a content source. One function of the web cache server 300 may be to improve the performance of web sites by caching frequently accessed content. For example, the requesting device may be a client using a browser 335 or other client-side device (340, 345) that communicates via a network interface 350 of the web cache server 300. The content source can include the origin server 320 and/or other data sources 330 (e.g. data bases, web pages, files, and so on).

Figure 4:
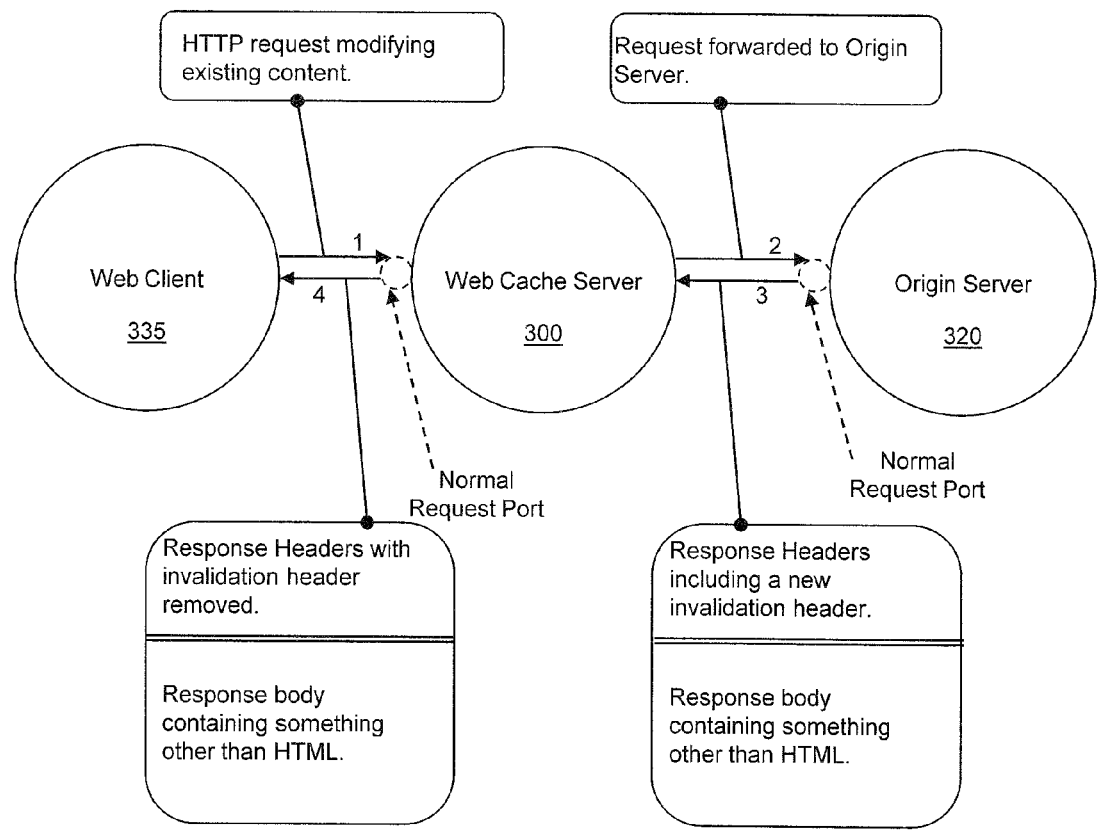
FIG. 4 illustrates one embodiment of a process that handles an invalidation directive with the system of FIG. 3.

With reference to FIG. 4, one embodiment of processing an HTTP request with the web cache server 300 and origin server 320 of FIG. 3 is illustrated.

FIG. 4 shows an incoming request (arrow number 1) submitted from a web client 335. Suppose the request is for modifying some content stored on the origin server 320. The web cache server 300 forwards the request to the origin server 320 (arrow number 2), which in turn modifies the appropriate content in response to the request. Since the content has been modified, the origin server 320 generates an invalidation directive to instruct the web cache server 300 to invalidate the affected content. The invalidation directive is embedded in the header of a response as previously described. This may be regarded as a special header (an invalidation response header). The response (including the invalidation header) is transmitted to the web cache server 300 (arrow number 3). Since the invalidation directive is embedded in to the header, the response body may be any type of content including non-HTML content. One embodiment of example syntax and semantics of the invalidation header is discussed with reference to FIG. 5.

Web cache server 300 receives the response and extracts the invalidation header, invalidates the corresponding content and forwards the response to the client (arrow number 4). In one embodiment, the invalidation header is removed from the header in the response prior to sending the response to the client.

Note that in the scenario of FIG. 4, the invalidation response header pertains to the request that caused the invalidation. But in general, the origin server 320 is configured to include (or piggyback) an invalidation response header on any random response. The origin server 320 may choose, for example, to delay the sending of an invalidation directive and then send the directive later (presumably at a more convenient time) in a response to a request that is unrelated with the request that caused the invalidation in the first place.

In one embodiment, the web cache server 300 is configured to strip out the invalidation response header when returning the response to the web client 335. However, the web cache server 300 may also strip out the invalidation response header when returning the response to another member/node of a computing cluster to which the web cache server 300 belongs since cluster propagation will forward the invalidation to other peers in the cluster.

In another embodiment, the origin server 320 may be configured to generate and return a response that contains both ESI tags for inline invalidation embedded in the HTML of the response body as well as an invalidation response header. Little or no extra coding effort is needed to make this hybrid functionality possible because ESI tags and response header invalidation work independently of each other. Thus the system can be configured to allow this hybrid approach to be performed. In one example, the ESI tags in the body can identify a first content to invalidate and the invalidation header can identify a different content to invalidate.

Example Syntax

Different syntax can be implemented as desired. The following examples are provided for purposes of discussion. They are not intended to limit the configuration of the invalidation mechanism. Zero or more of the examples may be implemented in any one embodiment.

FIG. 5 shows one embodiment of syntax for the invalidation response header using an extended BNF notation (Backus Naur Form). One or more of the commands/parameters shown in FIG. 5 may be omitted or other commands/parameters may be added as desired for a particular implementation. Other syntax and other types of characters may also be used. The example of FIG. 5 is not intended to limit any embodiment.

In one embodiment, the invalidation response header includes a designated header name that can be identified by the web cache server as an invalidation directive and/or used to distinguish it from other headers. Example names/identifier may be "Oracle-WebCache-Invalidate", "Invalidation Header", and so on. The header name may be followed by zero or more invalidation disjuncts. Commas or other characters can be used as separators between disjuncts. Synchronicity predicates may appear before or after any disjunct. Other syntax may be used and more or less of the shown attributes/parameters may be used.

A synchronicity predicate includes a synchronicity directive followed by an equal sign (=) followed by either the keyword "ON" or the keyword "OFF".

The synchronicity directive includes the keyword "SYNCHRONOUS".

An invalidation disjunct includes either a URI predicate or a multi-conjunct specification. A URI is a uniform resource identifier that identifies some content. For example, the URI is a string of characters used to identify a name, an address, or a resource. Of course, other types of identifiers can be used.

A URI predicate includes a URI option directive followed by an equal sign (=) followed by a quoted string. A URI option directive includes the keyword "URI".

A multi-conjunct specification may have two distinct formats: 1) explicit directory and 2) implicit directory (also known colloquially as "naked" S_KEY). The explicit directory format includes a URI directory predicate followed by zero or more search key predicates with each search key predicate preceded by a delimiter (e.g. semicolon ;). The implicit directory format includes 1 or more search key predicates with consecutive search key predicates separated by a semicolon (;) delimiter.

A URI directory predicate includes a URI directory option directive followed by an equal sign (=) followed by a quoted string.

A URI directory option directive includes the keyword "URI_DIR".

A search key predicate includes a search key option directive followed by an equal sign (=) followed by a quoted string.

A search key option directive includes the keyword "S_KEY".

Example URI Formats

Different syntax can be implemented as desired. In one embodiment, the syntax allows either fully qualified URIs or path-only URIs for the URI and URI_DIR directives. A fully qualified URI contains a scheme (e.g. http:// or https://), a valid host name (e.g. www.host1.com) and an optional port number in addition to the path. A path-only URI, as the name implies, contains only a path, no scheme, host name or port number. FIG. 5 below illustrates examples of both URI formats:

| Fully qualified: | "http://www.host1.com/foo/bar/index.html" |
| Path-only: | "/foo/bar/index.html" |

For fully qualified URIs, a valid scheme (either http:// or https://) and a valid host name (e.g. www.host1.com) should be used. Port numbers, when specified, should be valid as well. When a URI does not contain a port number, the web cache server 300 is configured to assume a default port number of 80 for http and 443 for https. The web cache server 300 will determine the URI's site definition by supplying the scheme, host name, port number and path from the URI to a site normalization (i.e. alias resolution) routine. Web cache server 300 can ensure that the resulting site definition matches the site definition associated with the original request. In other words, as a security precaution in one embodiment, web cache server 300 disallows cross-site invalidation. In the URI format examples that follow, another embodiment of the web cache server 300 is configured to host three sites listed in Table 1 below. (A site definition is uniquely identified by the combination of four components: scheme, host name, port number and optional path prefix.)

TABLE 1

| Scheme | Host | Port Number | Path Prefix |
|---|---|---|---|
| http | www.host1.com | 80 | /app/ |
| http | www.host1.com | 80 | / |
| http | www.host2.com | 80 | / |

Also, in all the examples below, the original request asks to get /app/index.html from host www.host1.com via http port 80—i.e. the original request resolves to the first site definition.

Matching Fully Qualified URI

Suppose the invalidation response header directs the web cache server 300 to invalidate the following fully qualified URI: http://www.host1.com/app/index2.html. Since both the original request and the URI from the invalidation response header resolve to the first site definition, the invalidation can proceed.

Fully Qualified URI, Prefix Mismatch

Suppose the invalidation response header directs the web cache server 300 to invalidate the following fully qualified URI: http://www.host1.com/foo/index2.html. The original request resolves to the first site definition, but due to a differing path prefix, the URI from the invalidation response header resolves to the second site definition, so the invalidation can't proceed.

Fully Qualified URI, Host Mismatch

Suppose the invalidation response header directs the web cache server 300 to invalidate the following fully qualified URI: http://www.host2.com/app/index2.html. The original request resolves to the first site definition, but due to a differing host name, the URI from the invalidation response header resolves to the third site definition, so the invalidation can't proceed.

Matching Path-only URI

Suppose the invalidation response header directs the web cache server 300 to invalidate the following path-only URI: /app/index2.html. Web Cache uses the scheme, host name and port from the original request (http, www.host1.com and 80 respectively) along with the path from the invalidation response header (/app/index2.html) to identify the first site definition. Since this matches the site definition from the original request, the invalidation can proceed.

Path-only URI, Prefix Mismatch

Suppose the invalidation response header directs the web cache server 300 to invalidate the following path-only URI: /foo/index2.html. Web cache server 300 uses the scheme, host name and port from the original request (http, www.host1.com and 80 respectively) along with the path from the invalidation response header (/foo/index2.html) to identify the second site definition. Since the original request resolves to the first site definition, the invalidation can't proceed.

Example Semantics

The following examples are provided for purposes of discussion. They are not intended to limit the configuration of the invalidation mechanism. Zero or more of the examples may be implemented in any one embodiment.

SYNCHRONOUS Directive

In one embodiment, a SYNCHRONOUS directive can be implemented that instructs the web cache server 300 whether or not to complete the invalidation before returning the response to the client. It applies to the invalidation as a whole (i.e. the combination of all invalidation response headers for a given response.) By default, Web cache server 300 is configured to wait for the invalidation to complete (SYNCHRONOUS=ON) before returning the response. This case may happen when the original request updates content hosted by the Origin Server 320, and the Origin Server 320, in turn, wants to ensure that Web Cache invalidates all its entries associated with that content before the client receives a response. In other words, there is a direct link between the original request and the content identified in the invalidation response header.

If the origin server 320 appends an invalidation response header to a random request, the client sending the request should not have to wait for the invalidation to complete. In this case, the origin server 320 instructs the web cache server 300 to return the response before proceeding with the invalidation (SYNCHRONOUS=OFF).

The origin server 320 can be configured to supply at most one SYNCHRONOUS directive in a response with invalidation response headers, but the web cache server 300 does not have to require this format. Each invalidation response header may have multiple SYNCHRONOUS directives, so a given response could contain more than one SYNCHRONOUS directive. When this occurs, the web cache server 300 will follow the last directive it encounters. This behavior gives the origin server 320 the maximum flexibility about where to place the synchronous directive.

URI Option Directive

An invalidation specification with the URI option directive tells the web cache server 300 to invalidate the entry with the specified URI.

URI_DIR Option Directive

An invalidation specification with the URI_DIR option directive tells the web cache server 300 to interpret the specified URI as a directory and to invalidate all entries stored in that specified directory.

S_KEY Option Directive

An invalidation specification with the S_KEY option directive tells the web cache server 300 to interpret the quoted string as a search key.

When an S_KEY option directive appears in a disjunct that has no explicit URI directory predicate, the web cache server 300 may be configured to use an implicit URI directory equivalent to the root of the site definition associated with the incoming request. In particular, if the site definition contains a path prefix, the implicit URI directory will include this path prefix. (See example below "Search Key Invalidation with Implicit URI Directory").

Conjoined Multiple Predicates

An invalidation response header disjunct may contain a URI directory predicate followed by one or more search key predicates. In this situation, a semicolon (;) delimiter may be used to separate each predicate. When this occurs, a web cache entry should match all the predicates to qualify for invalidation. In other words, the web cache server 300 is configured to join each predicate using logical AND.

Multiple Invalidation Disjuncts

In one embodiment, when an invalidation response header contains multiple invalidation disjuncts with each consecutive pair of invalidation disjuncts separated by a comma (,), a Web Cache entry must match at least one of the invalidation disjuncts to qualify for invalidation. In other words, Web Cache joins each invalidation disjunct within a given invalidation response header using logical OR.

Mixing Commas and Semicolons

When an invalidation response header contains both kinds of separators—commas (logical OR) and semicolons (logical AND)—semicolons take precedence, in one embodiment. In other words, a web cache may be configured to first examine consecutive predicates separated by semicolons, thus forming a set of disjuncts; it then examines consecutive disjuncts separated by commas.

Multiple Invalidation Response Headers

An origin server can store multiple invalidation response headers in its response to the web cache server 300. When this happens, a web cache entry attempts to match one of the headers to qualify for invalidation. In other words, the values from multiple invalidation response headers in the same response are treated as separate disjuncts (e.g. join them using logical OR).

EXAMPLES

In this section, examples are presented that illustrate the various option directives and combinations that may be implemented. The examples are not intended to be limiting in any way. The examples refer to a web application for Harry's Hardware store with the web site www.HarrysHardware.com. At this site, Harry publishes descriptions (including the retail price) for all the popular items he sells. Harry improves the response time for his on-line customers by deploying a Web Cache in front of the web server hosting his site, but to ensure his on-line customers see fresh content, he wants the application to invalidate relevant Web Cache entries whenever it updates descriptions or prices for items in the store. The examples below indicate how to use response header invalidation for various scenarios that Harry has identified.

Basic URI Invalidation

Harry sells one particularly popular item called the HardHead 86 hammer, and the corresponding description page has the following URI:

http://www.harryshardware.com/products/tools/hammers/HardHead86.html

If Harry decides to put the HardHead 86 on sale, his web application could invalidate the appropriate Web Cache entry with an invalidation response header containing a fully specified URI:

```
Oracle-WebCache-Invalidate:
URI="http://www.harryshardware.com/products/tools/hammers/HardHead86.html"
```

Alternatively, the application could return an invalidation response header with a path-only URI:
Oracle-WebCache-Invalidate: URI="/products/tools/hammers/HardHead86.html"

Directory URI Invalidation

If Harry decides to put all the hammers in his store on sale, his web application could invalidate all Web Cache entries for hammers with an invalidation response header containing a fully specified URI directory:

```
Oracle-WebCache-Invalidate:
URI_DIR="http://www.harryshardware.com/products/tools/hammers/"
```

Alternatively, the application could return an invalidation response header with a path-only URI directory:
Oracle-WebCache-Invalidate: URI_DIR="/products/tools/hammers/"

Asynchronous Invalidation

In the preceding examples, a synchronicity predicate was not specified. Thus by default the web cache server 300 is configured to complete the invalidation before returning the response to the client. If Harry wanted the example from above to proceed asynchronously (i.e. if he didn't want Web Cache to wait for the invalidation to complete before returning the response), his web application could send an invalidation response header that looks like this:

```
Oracle-WebCache-Invalidate: SYNCHRONOUS=OFF,
URI_DIR="http://www.harryshardware.com/products/tools/hammers/"
```

Notice that the response header above contains a fully qualified URI directory. Alternatively, the application could return an invalidation response header with a path-only URI directory:

```
Oracle-WebCache-Invalidate:
  SYNCHRONOUS=OFF,URI_DiR="/products/tools/hammers/"
```

Search Key Invalidation with Explicit URI Directory

Suppose that Harry wants to reduce the price of all Sears Craftsman saws but not the handsaws, just the power saws (e.g. skill saws and chainsaws). His web application could invalidate all the necessary entries with an invalidation response header that looks like this:

```
Oracle-WebCache-Invalidate:
URI_DIR="http://www.harryshardware.com/products/tools/saws/";
S_KEY="PowerTools";S_KEY="SearsCraftsman"
```

The addition of the S_KEY directive can be used to ensure that the invalidation of only Sears Craftsman power saws. When an invalidation response header contains multiple predicates separated by semicolons, a web cache entry must match all predicates for the invalidation to take place.

Also note that the response header above contains a fully qualified URI directory. Alternatively, the application could return an invalidation response header with a path-only URI directory:

```
Oracle-WebCache-Invalidate:    URI_DIR="/products/tools/saws/";
S_KEY="PowerTools";S_KEY="SearsCraftsman"
```

Search Key Invalidation with Implicit URI Directory

Suppose that Harry sets up an additional site for selling large appliances (dishwashers, refrigerators, etc.). Suppose also that he defines this site using a path prefix of /products/appliances. Table 2 below lists example site definitions for the two sites.

TABLE 2

| Scheme | Host | Port Number | Path Prefix |
| --- | --- | --- | --- |
| http | www.harryshardware.com | 80 | /products/appliances |
| http | www.harryshardware.com | 80 | / |

Suppose the first site pertains strictly to large appliances and the second site applies to everything else in Harry's store. Suppose further that Harry changes the price for all Maytag refrigerators and that the site definition for an incoming request pertains to Harry's appliance site—scheme http, host name www.harryshardware.com, (optional) port 80 and path prefix of /products/appliances. The web application could invalidate all the necessary entries with an invalidation response header that may look like this:

Oracle-WebCache-Invalidate: S_KEY="Maytag"; S_KEY="Refrigerators"

In this example, the invalidation response header contains only search key predicates. It does not contain a URI directory predicate. When this happens, the web cache server 300 may be configured to form an implicit URI directory from the site definition associated with the incoming request. In this case the implicit directory corresponds to:

http://www.harryshardware.com/products/appliances/

As before, with multiple predicates separated by semicolons, a web cache entry must match all predicates for the invalidation to take place, in one embodiment.

An equivalent invalidation response header with an explicit, fully qualified URI directory may look like this:

```
Oracle-WebCache-Invalidate:
URI_DIR="http://www.harryshardware.com/products/appliances/";
S_KEY="Maytag";S_KEY="Refrigerators"
```

An equivalent invalidation response header with an explicit, path-only URI directory may look like this:

```
Oracle-WebCache-Invalidate:    URI_DIR="/products/appliances/";
S_KEY="Maytag";S_KEY="Refrigerators"
```

Multiple Invalidation Disjuncts

Suppose that Harry wants to upgrade his entire inventory of drills and wrenches. His web application could invalidate all the necessary entries with a response containing the following invalidation response header:

```
Oracle-WebCache-Invalidate:
URI_DIR="http://www.harryshardware.com/products/tools/drills/",
URI_DIR="http://www.harryshardware.com/products/tools/wrenches/"
```

In one embodiment, when an invalidation response header contains two consecutive invalidation specifications separated by a comma, a web cache entry only needs to match one of the two invalidation specifications for the invalidation to take place.

In the response header above, it contains fully qualified URI directories. Alternatively, the application could return an invalidation response header with path-only URI directories, for example:

```
Oracle-WebCache-Invalidate:
    URI_DIR="/products/tools/drills/",URI_DIR="/products/tools/wrenches/"
```

Mixing Commas and Semicolons

Suppose that Harry wants to put both the HardHead 86 hammer and all Sears Craftsman power saws on sale. His web application could invalidate all the necessary entries with a response containing the following invalidation response header:

```
Oracle-WebCache-Invalidate:
URI="http://www.harryshardware.com/products/tools/hammers/HardHead86.html",
URI_DIR="http://www.harryshardware.com/products/tools/saws/";
S_KEY="PowerTools";S_KEY="SearsCraftsman"
```

Here, both the comma and semicolon are used as separators. In this example, the first disjunct includes only the URI for the HeardHead 86 hammer. The second disjunct includes three invalidation specifications: the URI directory for saws and the search keys for Power Tools and Sears Craftsman tools. In one embodiment, semicolons take precedence over commas.

In the above example, the response header contains a fully qualified URI and a fully qualified URI directory. Alternatively, the application could return an invalidation response header with a path-only URI and a path-only URI directory:

```
Oracle-WebCache-Invalidate:
URI="/products/tools/hammers/HardHead86.html",
URI_DIR="/products/tools/saws/";S_KEY="PowerTools";
S_KEY="SearsCraftsman"
```

Multiple Invalidation Response Headers

Returning to the example of "Multiple Invalidation Disjuncts," a web application, alternatively, could invalidate all the necessary entries with a response containing two separate invalidation response headers:

```
Oracle-WebCache-Invalidate:
URI_DIR="http://www.harryshardware.com/products/tools/drills/"
Oracle-WebCache-Invalidate:
URI_DIR="http://www.harryshardware.com/products/tools/wrenches/"
```

In one embodiment, the values of two different invalidation response headers in the same response are treated as separate disjuncts (e.g. logically OR them together).

The response headers above each contained a fully qualified URI directory. Alternatively, the application could return invalidation response headers with path-only URI directories:

```
Oracle-WebCache-Invalidate: URI_DIR="/products/tools/drills/"
Oracle-WebCache-Invalidate: URI_DIR="/products/tools/wrenches/"
```

While the figures illustrate various actions occurring in serial, it is to be appreciated that various actions could occur substantially in parallel and/or in other orders. While a certain number of processes/actions are described, it is to be appreciated that a greater and/or lesser number of processes/actions could be employed. Moreover, less than all the illustrated blocks may be used to implement an example methodology. Blocks may be combined or separated into multiple components. Furthermore, additional and/or alternative methodologies can employ additional, not illustrated blocks.

In another embodiment, the described components, methods and their equivalents may be implemented with computer executable instructions. Thus, in one embodiment, a non-transitory computer-readable medium is configured with stored computer executable instructions that if executed by a machine (e.g., processor, computer) cause the machine (and associated components) to perform the method or functions of the associated component(s).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use.

What is claimed is:

1. A non-transitory computer-readable medium storing computer-executable instructions executable by at least one computer to cause the computer to:
   identify web site content that has been modified, wherein the web site content is cached by a web cache server;
   generate an invalidation directive, where the invalidation directive includes an instruction to the web cache server to invalidate the identified web site content;
   embed the invalidation directive into the header of a response to a client request from a web client;
   transmit the response to the web cache server such that the web cache server forwards the response to the web client;
   in response to receiving the response, parse, by the web cache server, the header of the response to identify the instruction to invalidate the identified web site content included in the invalidation directive; and
   invalidate, by the web cache server, cached content that corresponds to the web site content identified by the invalidation directive.

2. The non-transitory computer-readable medium of claim 1, further comprising executable instructions to cause the web cache server to: modify the response, by the web cache server, by removing the invalidation directive from the header of the response; and transmit the modified response to the web client via a network interface.

3. The non-transitory computer-readable medium of claim 1, where the response is generated as a reply to an HTTP request.

4. The non-transitory computer-readable medium of claim 1, further including executable instructions that cause the web cache server to generate the response by including a body, where the body includes non-HTML content.

5. The non-transitory computer-readable medium of claim 1, further including generating one or more processing options associated with the invalidation directive and embedding the one or more processing options in the header of the response.

6. A computer-implemented method comprising:
   identifying, by a first computer, web site content that has been modified, where the web site content is cached by a web cache server;
   generating, by the first computer, an invalidation directive, where the invalidation directive includes an instruction to invalidate the identified web site content;
   embedding, by the first computer, the invalidation directive into the header of a response to a client request received from a client device;
   transmitting, by the first computer, the response to the web cache server such that the web cache server forwards the response to the client device;
   in response to receiving the response, parsing, by the web cache server, the header of the response to identify the instruction to invalidate the identified web site content included in the invalidation directive; and
   invalidating, by the web cache server, cached content that corresponds to the web site content identified by the invalidation directive.

7. The computer-implemented method of claim 6, further comprising: receiving, by the first computer, the client request as an HTTP request; and where the response is generated as a reply to the HTTP request.

8. The computer-implemented method of claim 6, further comprising: modifying the response, by the web cache server, by removing the invalidation directive from the header of the response; and transmitting, by the web cache server, the modified response to the client device.

9. The computer-implemented method of claim 6, further comprising generating the response, by the first computer, to include the header and a body, where the body includes non-HTML content.

10. The computer-implemented method of claim 6, further including generating, by the first computer, one or more processing options associated with the invalidation directive and embedding the one or more processing options in the header of the response.

11. The non-transitory computer-readable medium of claim 1, further including executable instructions that cause the at least one computer to generate a body for the response where the body includes body content that responds to the client request, and where the body content either corresponds to or does not correspond to the web site content that has been modified.

12. The computer-implemented method of claim 6, further including generating, by the first computer, a body for the response where the body includes body content that responds to the client request, and where the body content either corresponds to or does not correspond to the web site content that has been modified.

13. A computing system, comprising:
   a first server connected by a network interface to a web cache server, wherein the first server includes at least a processor and a memory for executing stored instructions that cause the first server to:
   identify web site content, stored by the first server, that has been modified, wherein the web site content is also cached by the web cache server;
   generate an invalidation directive, where the invalidation directive includes an instruction to the web cache server to invalidate the identified web site content;
   embed the invalidation directive into the header of a response to a client request received from a web client;
   transmit the response to the web cache server via a network communication such that the web cache server forwards the response to the web client; and
   the web cache server including at least a cache memory, and cache processor for executing stored instructions that cause the web cache server to:
   in response to receiving the response from the first server, parse the header of the response to identify the instruction to invalidate the identified web site content included in the invalidation directive; and invalidate cached content within the cache memory that corresponds to the web site content identified by the invalidation directive.

\* \* \* \* \*